United States Patent [19]

Michna et al.

[11] Patent Number: 5,096,458

[45] Date of Patent: Mar. 17, 1992

[54] PREPARATION OF STABLE ANIONIC DYESTUFF SOLUTIONS: PRESSURE PERMEATION OF CRUDE DYE IN SOLUTION OF LITHIUM OR AMMONIUM SALT

[75] Inventors: Martin Michna, Pulheim; Hans-Werner Zillger, Hennef-Stein; Dietrich Tegtmeyer, Cologne, all of Fed. Rep. of Germany

[73] Assignee: Bayer Aktiengesellschaft, Leverkusen, Fed. Rep. of Germany

[21] Appl. No.: 627,068

[22] Filed: Dec. 13, 1990

[30] Foreign Application Priority Data

Dec. 22, 1989 [DE] Fed. Rep. of Germany ....... 3942467

[51] Int. Cl.$^5$ ..................... C09B 67/54; C09B 69/02
[52] U.S. Cl. ........................................... 8/527; 8/440; 8/543; 8/549; 8/606; 8/648; 8/937; 8/680
[58] Field of Search ................... 8/527, 440, 543, 606

[56] References Cited

U.S. PATENT DOCUMENTS

| | | | |
|---|---|---|---|
| 4,648,883 | 3/1987 | Podder | 8/440 |
| 4,684,453 | 8/1987 | Vaughan | 8/440 |
| 4,808,192 | 2/1989 | Narita et al. | 8/527 |
| 4,955,987 | 9/1990 | Lacroix et al. | 8/549 |

*Primary Examiner*—A. Lionel Clingman
*Attorney, Agent, or Firm*—Sprung Horn Kramer & Woods

[57] ABSTRACT

Stable aqueous solutions of anionic dyestuffs, preferably reactive dyestuffs, are obtained at very low costs by pressure permeation, if the feed solution for the pressure permeation is prepared by stirring the optionally dried presscake or the suspension of the crude dyestuff in an electrolyte solution.

6 Claims, No Drawings

PREPARATION OF STABLE ANIONIC DYESTUFF SOLUTIONS: PRESSURE PERMEATION OF CRUDE DYE IN SOLUTION OF LITHIUM OR AMMONIUM SALT

The present invention relates to a process for the preparation of highly concentrated aqueous solutions of anionic dyestuffs, in particular reactive dyestuffs. To obtain stable concentrated aqueous solutions of dyestuffs and fluorescent whitening agents, it is often necessary to greatly diminish the salt content, such as obtained after synthesis and isolation. In industry, this is predominantly done by pressure permeation, in which salt-containing permeate is discharged through a semipermeable membrane and replaced by deionized water. In many cases, this is followed by a concentration step, in which only permeate is discharged but no water is added.

In industrial processes, a 1- to 4-fold exchange of the original water volume is necessary for substantial desalting. To keep the costs for this process step low, it is therefore advantageous to start with small volumes, i.e. high concentrations.

Ideally the feed solutions could be suspensions of the products to be desalted. However, this requires specific structural designs of the pressure permeation modules to prevent clogging or covering of the membrane surface with product. However, such plants have considerably higher investment and operating costs than plants which can only process solutions.

Surprisingly, it has now been found that these drawbacks can be avoided and particularly highly concentrated true dyestuff solutions can be used for pressure permeation by preparing the feed solution for the pressure permeation by stirring the optionally dried presscake or the suspension of the crude dyestuff in a solution of lithium salts or ammonium salts of organic or inorganic acids.

This effect has to be considered surprising because usually the addition of salts to dyestuff solutions reduces their solubility (salting-out!). In contrast, the salts according to the invention increase the solubility of the dyestuffs.

Suitable salts for preparing the electrolyte solutions are lithium salts and ammonium salts of inorganic and organic acids, but in particular lithium salts and trialkylammonium salts, which may be further substituted, of hydrohalic acids, of oxo acids of sulphur and of nitrogen, aliphatic and aromatic carboxylic acids, sulphonic acids and phosphonic acids, but preferably the lithium salts and trialkylammonium salts of the structure

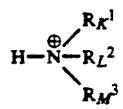

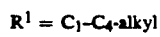

$R^1 = C_1-C_4$-alkyl $R^2 = -(CH-CH-O)_nH$

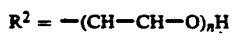

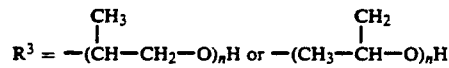

K = 0 to 2
L = 0 to 3
M = 0 to 3
K + L + M = 3
n = 1 to 4 of nitric acid, carbonic acid and citric acid.

The salts according to the invention are present in the feed solutions before the pressure permeation in concentrations between 0.1 to 20% by weight, but preferably between 0.5 and 5% by weight.

When carrying out the process in practice, the procedure is such that suitable salts in solid form or as a concentrated solution are added to the reaction suspension present after the synthesis and already containing salts, resulting in the concentration of the salt in question required for a solution of the dyestuff.

However, it is preferred first to isolate the dyestuff and then to add the salt-containing presscake to a solution of a suitable salt. The concentration of this salt solution is chosen in such a manner that the dyestuff completely goes into solution.

Suitable dyestuffs to be processed to stable solutions are anionic dyestuffs, but in particular reactive dyestuffs. Reactive dyestuffs containing two or more identical or different reactive groups are also suitable.

The reactive dyestuffs can belong to a wide range of classes, for example the series of metal-free or metal-containing mono- or polyazo dyestuffs, metal-free or metal-containing azaporphin dyestuffs, such as copper phthalocyanine, cobalt phthalocyanine or nickel phthalocyanine dyestuffs, the anthraquinone, oxazine, dioxazine, triphenylmethane, nitro, azomethine, metal-free or metal-containing formazan dyestuff.

In the context of this invention, the term "dyestuff" is, by the way, also understood to mean anionic fluorescent whitening agents.

The solutions are subjected to pressure permeation through conventional asymmetric polymer membranes, in which salt-containing permeate is discharged and, if desired, replaced completely or in part by deionized water.

Preferably, the pressure permeation, that is reverse osmosis and ultrafiltration, is used in which the passage of water and any substances dissolved through the semipermeable membrane takes place under the driving force of a hydrostatic pressure exceeding the osmotic pressure.

The pressure permeation for the process according to the invention can be carried out on all commercially available pressure permeation apparatuses. These apparatuses can be designed, for example, as a plate, tubular, hollow-fibre or hollow-fine-fibre module. The membranes usable according to the invention and insertable into the module described above are, for example, those made of cellulose, cellulose diacetate or triacetate or those made of synthetic polymers, such as, for example, polyamides, polyolefins and polysulphones. Membranes made of porous glass or "dynamic membranes" formed from heavy metal oxides and partially water-soluble polymers, such as, for example, polyacrylic acid can also be used.

The solutions prepared by the process according to the invention can be used, after the addition of a buffer and, if necessary, of one or more water-miscible organic solvents or solubilizing agents.

Examples of suitable agents are open-chain or cyclic amides, ureas, sulphones and sulphoxides, mono- and polyhydric alcohols and ethers thereof, polyethers and esters derived therefrom and dicyandiamide. If desired, these agents can also be added before the pressure permeation, in order to increase the concentration of the solution even further. However, part of the additives goes into the permeate during the pressure permeation.

However, the solutions prepared by the process according to the invention can also be processed, if appropriate after addition of buffers and suitable additives by spray-drying and other drying processes to give solid formulations. If desired, buffers and additives can also be added after the drying.

In this manner, stable concentrated solutions of dyestuffs and white toners are obtained, which are highly suitable for the dyeing of sheetlike structures, predominantly textile substrates.

EXAMPLE 1

36.18 kg of a presscake of the dyestuff of the formula

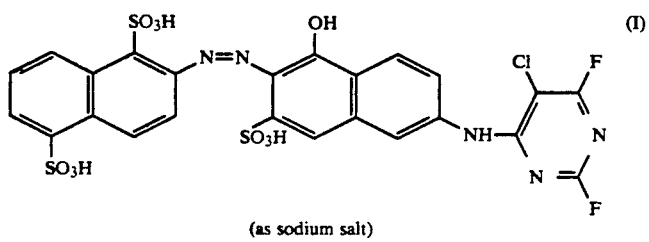

(as sodium salt)

are dissolved in 226.7 kg of LiHCO$_3$ solution (4% strength) at a temperature of 45° C. In addition to LiHCO$_3$, the solution then contains 8.1% of pure dyestuff and 0.22% of Cl$^-$.

This solution is desalted at a temperature of about 40°–45° C. and a pH of 7.5 and a pressure of 40 bar in a plate module. In this process, 788.7 kg of salt-containing permeate are continuously replaced by 788.7 kg of demineralized water and then concentrated by removing 168.9 kg of salt-containing permeate. The membrane used is a commercially available composite membrane (support layer: polysulphone, membrane layer: polyamide).

2 kg of dicyandiamide and 3.5 kg of demineralized water are added to 94 kg of concentrate, and the mixture is buffered with 0.5 kg of boric acid.

A low-viscous stable liquid formulation of the dyestuff of the formula (I) containing 21.2% of pure dyestuff, 2% of dicyandiamide, 0.5% of boric acid and water to add up to 100% is obtained. The pH of the formulation is 7.5; Cl$^-$ content: <0.05%.

EXAMPLE 2

10 kg of a presscake of the dyestuff of the formula (I) (sodium salt) are dissolved in 73.3 kg of lithium citrate solution (4% strength) at a temperature of 40° C. In addition to lithium citrate, the solution then contains 4.2% of pure dyestuff and 0.86% of Cl$^-$.

This solution is salted at a temperature of 40° C., a pH of 7.5 and a pressure of 40 bar in a plate module (with polysulphone membrane).

For this purpose, 166.6 kg of salt-containing permeate are continuously replaced by 166.6 kg of demineralized water and then concentrated by removing 67 kg of salt-containing permeate. 0.35 kg of dicyandiamide and 0.6 kg of demineralized water are then added to 16.3 kg of concentrate, and the mixture is buffered with 0.09 kg of boric acid.

A low-viscous stable liquid formulation of the dyestuff of the formula (I) containing 21.2% of pure dyestuff, 2% of dicyandiamide, 0.5% of boric acid and water to add up to 100% is obtained. The pH of the formulation is 7.5; Cl$^-$ content: <0.05%.

EXAMPLE 3

10 kg of a presscake of the dyestuff of the formula

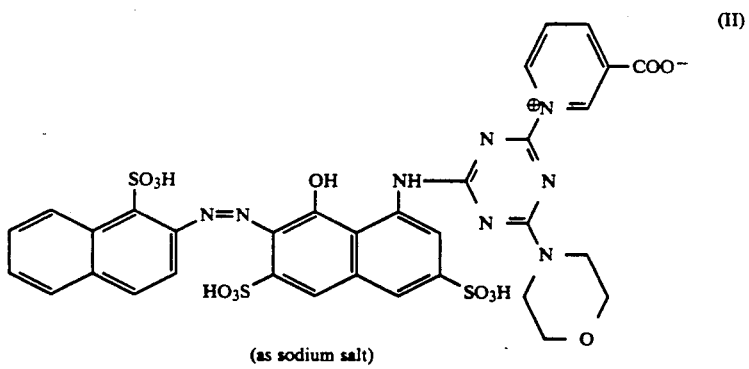

(as sodium salt)

are dissolved in 45.6 kg of LiNO$_3$ solution (4% strength) at RT. In addition to LiNO$_3$, the solution then contains about 8% of pure dyestuff and 0.23% of Cl$^-$. This solution is desalted at room temperature, a pH of 7.5 and a pressure of 40 bar in a plate module.

For this purpose, 111.2 kg of salt-containing permeate are continuously replaced by 111.2 kg of demineralized water and then concentrated by removing 30.1 kg of salt-containing permeate. 1.46 kg of demineralized water and 0.54 kg of dicyandiamide are then added to 25.5 kg of concentrate, and the mixture is buffered with 0.14 kg of boric acid.

A low-viscous stable liquid formulation of the dyestuff of the formula (II) containing about 16% of pure dyestuff, 0.5% of boric acid, 2% of dicyandiamide and water to add up to 100% is obtained. The pH of the formulation is 7.5; Cl$^-$ content: <0.05%.

EXAMPLE 4

285.8 kg of a presscake of the dyestuff of the formula

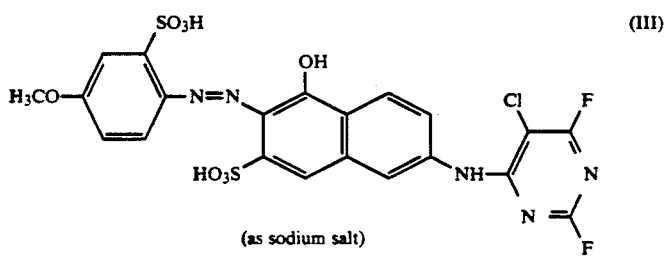

(as sodium salt)

are dissolved in 1,300 kg of lithium oxalate solution (3% strength) at a temperature of 40° C. In addition to lithium oxalate, the solution then contains 5.5% of pure dyestuff and 0.63% of Cl⁻.

This solution is desalted at a temperature of about 35°–40° C., a pH of 7.5 and a pressure of 40 bar in a plate module (with polysulphone membrane). For this purpose, 5568 kg of salt-containing permeate are continuously replaced by 5568 kg of demineralized water and then concentrated by removing 824.7 kg of salt-containing permeate.

12.7 kg of dicyandiamide and 18.6 kg of demineralized water are then added to 761.3 kg of concentrate, and the mixture is buffered with 0.4 kg of boric acid.

A low-viscous stable liquid formulation of the dyestuff of the formula (III) containing 1.6% of dicyandiamide, 0.5% of boric acid and water to add up to 100% is obtained. The pH of the formulation is 7.5; Cl⁻ content: <0.05%.

EXAMPLE 5

332 kg of a presscake of the dyestuff of the formula

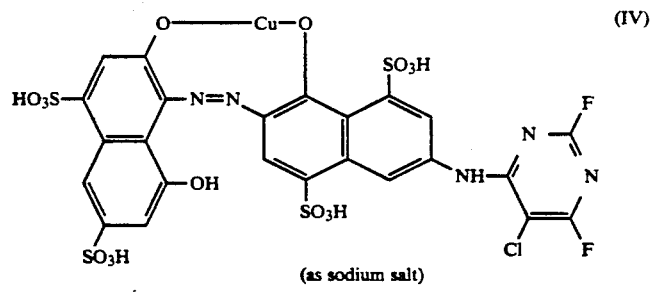

(as sodium salt)

are dissolved in 2181 kg of lithium nitrate (4% strength) at a temperature of ~30° C. In addition to lithium nitrate, the solution contains 3.3% of pure dyestuff and 1.5% of Cl⁻.

This solution is desalted at a temperature of 25°–30° C., a pH of about 5 and a pressure of 40 bar in a plate module (with polysulphone membrane).

For this purpose, 7539 kg of salt-containing permeate are continuously replaced by 7539 kg of demineralized water and, after removing 1613.5 kg of salt-containing permeate, 30 kg of ε-caprolactam and 65.5 kg of demineralized water are added, and the mixture is buffered with 5 kg of boric acid.

A low-viscous stable liquid formulation of the dyestuff of the formula (IV) containing 8.4% of pure dyestuff, 3% of ε-caprolactam, 0.5% of boric acid and water to add up to 100% is obtained. The pH of the formulation is 7.5; Cl⁻ content: <0.05%.

Loss of dyestuff in the permeate: <0.05%.

EXAMPLE 6

935 kg of a condensation liquor of the dyestuff of the formula

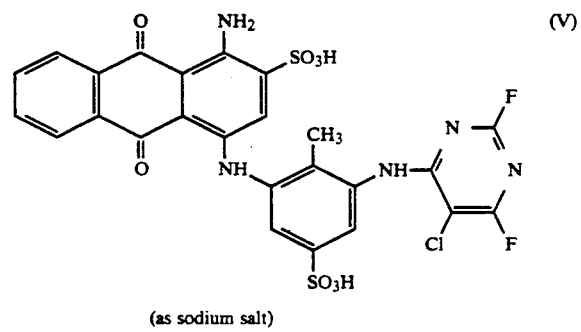

(as sodium salt)

are dissolved in 1065 kg of lithium methanesulphonate (6% strength) at a temperature of ~35° C. In addition to lithium methanesulphonate, the solution then contains 7.56% of pure dyestuff and 0.21% of Cl⁻.

This solution is desalted at a temperature of about 30°–35° C. a pH of 6 and a pressure of 40 bar in a plate module (with polysulphone membrane).

For this purpose, 4000 kg of salt-containing permeate are continuously replaced by 4000 kg of demineralized water and then concentrated by removing 1,118.4 kg of salt-containing permeate. 100.8 kg of ε-caprolactam and 20.2 kg of demineralized water are added to 881.6 kg of concentrate, and the mixture is buffered with 5 kg of boric acid.

A low-viscous stable liquid formulation of the dyestuff of the formula (V) containing 15% of pure dyestuff, 10% of ε-caprolactam, 0.5% of boric acid and water to add to up 100% is obtained. The pH content of the formulation is 7.5; Cl⁻ content: <0.05%.

Loss of dyestuff in the permeate: <0.05%.

EXAMPLE 7

1807 kg of presscake of the dyestuff of the formula

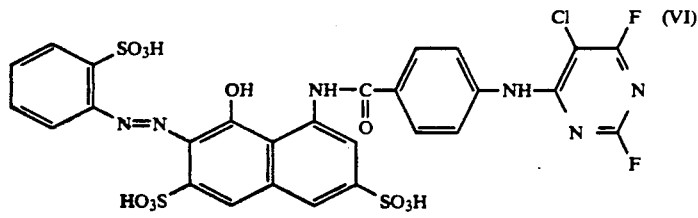

(as sodium salt)

are dissolved in 963 kg of lithium p-toluenesulphonate (6% strength) at a temperature of 40°–45° C. In addition to lithium p-toluenesulphonate, the solution then contains 4.6% of pure dyestuff and 0.98% of $Cl^-$.

This solution is desalted at a temperature of about 40° C., a pH of 7.5 and a pressure of 40 bar in a plate module (with polysulphone membrane).

For this purpose, 8310 kg of salt-containing permeate are continuously replaced by 8310 kg of demineralized water and then concentrated by removing 1967 kg of salt-containing permeate. 180.6 kg of ε-caprolactam and 15.2 kg of demineralized water are then added to 803 kg of concentrate, and the mixture is buffered with 5 kg of boric acid.

A low-viscous stable liquid formulation of the dyestuff of the formula (VI) containing 12.75% of pure dyestuff, 18% of ε-caprolactam 0.5% of boric acid and water to add up to 100% is obtained. The pH of the formulation is 7.5; $Cl^-$ content: <0.05%.

EXAMPLE 8

5 kg of a suspension of the dyestuff of the formula

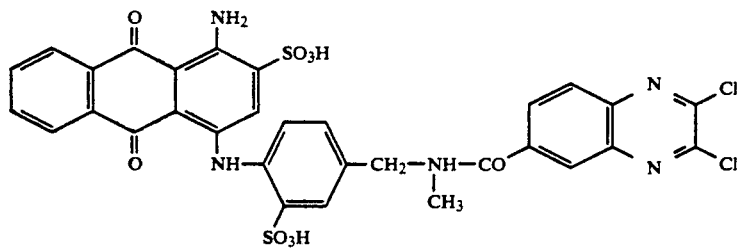

are dissolved in 5 kg of a 5% strength solution of the lithium salt of REAX 85 A* at room temperature. In addition to the lithium salt of REAX 85 A, the solution then contains 8.1% of pure dyestuff, 0.6% of $Cl^-$ and 0.25% of $SO_4{}^{2-}$.

*Product from Westvao, P.O. Box 70848, Charleston Heights, USA.

This solution is desalted at room temperature, a pH of 8 and a pressure of 40 bar in a plate module (with polysulphone membrane).

For this purpose, 20 kg of salt-containing permeate are continuously replaced by 20 kg of demineralized water and then concentrated by removing 6.9 kg of salt-containing permeate. 0.26 kg of N,N-dimethylurea and 0.32 kg of dermineralized water are then added to 3.1 kg of concentrate, and the mixture is buffered with 0.02 kg of boric acid.

A low-viscous stable liquid formulation of the dyestuff of the formula (VII) containing 22% of pure dyestuff, 7% of N,N-dimethylurea, 0.5% of boric acid and water to add up to 100% is obtained. The pH of the formulation is 7.5; $Cl^-$ content: <0.05%.

We claim:

1. Process for the preparation of stable aqueous solutions of anionic dyestuffs by pressure permeation of feed solutions of the crude dyestuffs, characterized in that the feed solution for the pressure permeation is prepared by stirring an optionally dried presscake of the crude dyestuff or a suspension of the crude dyestuff into an electrolyte solution containing 0.1 to 20% by weight of lithium salts or ammonium salts of organic or inorganic acids.

2. Process according to claim 1, characterized in that lithium salts and trialkylammonium salts of the formula

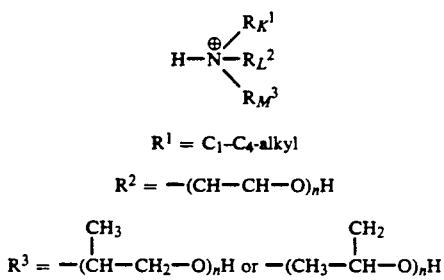

$R^1 = C_1-C_4$-alkyl $R^2 = -(CH-CH-O)_nH$ $R^3 = -\underset{\underset{CH_3}{|}}{(CH}-CH_2-O)_nH$ or $-(CH_3-\underset{\underset{CH_2}{|}}{CH}-O)_nH$ (VII)

$K = 0$ to $2$
$L = 0$ to $3$
$M = 0$ to $3$
$K + L + M = 3$
$n = 1$ to $4$ of nitric acid, carbonic acid and citric acid are used.

3. The process according to claim 1, wherein the anionic dyestuff is a reactive dyestuff.

4. The process according to claim 1, wherein the anionic dyestuff is an anionic fluorescent whitening agent.

5. The process according to claim 1, wherein the feed solution for the pressure permeation is prepared by stirring the optionally dried presscake of the crude dyestuff or the suspension of the crude dyestuff into an electrolyte solution containing 0.5 to 5% by weight of lithium salts or ammonium salts or organic or inorganic acids.

6. The process according to claim 1, wherein the crude dyestuff is dissolved in the electrolyte solution in a higher concentration than would be possible to dissolve the crude dyestuff in water.

* * * * *